(12) United States Patent
Misovski (10) Patent No.: US 8,863,010 B2
(45) Date of Patent: Oct. 14, 2014

(54) LINKING USER INTERFACE DESIGN ENVIRONMENT AND APPLICATION DEVELOPMENT ENVIRONMENT

(75) Inventor: Filip Misovski, Frankfurt (DE)

(73) Assignee: SAP AG, Walldorf (DE)

(*) Notice: Subject to any disclaimer, the term of this patent is extended or adjusted under 35 U.S.C. 154(b) by 1768 days.

(21) Appl. No.: 11/319,023

(22) Filed: Dec. 27, 2005

(65) Prior Publication Data
US 2007/0149036 A1 Jun. 28, 2007

(51) Int. Cl.
*G06F 3/048* (2013.01)
*G06F 9/44* (2006.01)

(52) U.S. Cl.
CPC .................................. *G06F 8/38* (2013.01)
USPC ........................................................ 715/762

(58) Field of Classification Search
USPC .................. 715/762; 719/315, 328
See application file for complete search history.

(56) References Cited

U.S. PATENT DOCUMENTS

| | | | | |
|---|---|---|---|---|
| 5,965,024 A * | 10/1999 | Van Ginkel et al. | .......... | 210/601 |
| 6,144,377 A * | 11/2000 | Oppermann et al. | ......... | 715/744 |
| 6,154,212 A | 11/2000 | Eick et al. | | |
| 6,208,345 B1 * | 3/2001 | Sheard et al. | ................. | 715/853 |
| 6,452,614 B1 * | 9/2002 | King et al. | .................... | 715/775 |
| 6,532,023 B1 * | 3/2003 | Schumacher et al. | ........ | 715/704 |
| 6,678,889 B1 * | 1/2004 | Burkett et al. | ................ | 718/104 |
| 6,701,513 B1 * | 3/2004 | Bailey | ........................... | 717/109 |
| 6,963,937 B1 * | 11/2005 | Kamper et al. | ................. | 710/73 |
| 6,976,059 B1 * | 12/2005 | Rogalski et al. | ............. | 709/218 |
| 6,981,242 B2 * | 12/2005 | Lehmeier et al. | ............ | 717/122 |
| 6,990,654 B2 * | 1/2006 | Carroll, Jr. | .................... | 717/109 |
| 7,152,229 B2 * | 12/2006 | Chong et al. | .................. | 717/146 |
| 7,434,167 B2 * | 10/2008 | Sinclair et al. | ................ | 715/744 |
| 7,464,367 B2 * | 12/2008 | Wain et al. | ..................... | 717/105 |
| 2004/0049776 A1 | 3/2004 | Fomenko et al. | | |
| 2004/0250238 A1 * | 12/2004 | Singh et al. | .................... | 717/108 |
| 2005/0071803 A1 * | 3/2005 | Cherdron et al. | ............. | 717/101 |
| 2005/0091670 A1 * | 4/2005 | Karatal et al. | ................ | 719/328 |
| 2006/0225037 A1 * | 10/2006 | Glein et al. | .................... | 717/117 |
| 2007/0079282 A1 * | 4/2007 | Nachnani et al. | ............ | 717/106 |

FOREIGN PATENT DOCUMENTS

WO  WO-2004019160 A1  3/2004

OTHER PUBLICATIONS

"International Application Serial No. 06024902.6-1243, Extended European Search Report mailed Dec. 27, 2007", 8 pgs.
Manning, Harley, "How to Design Sites that Satisfy Millions of Users," Forrester, Best Practices, Sep. 10, 2004, pp. 1-11.

(Continued)

*Primary Examiner* — Phenuel Salomon
(74) *Attorney, Agent, or Firm* — Schwegman Lundberg & Woessner, P.A.

(57) ABSTRACT

Creation of an application having a user interface is supported by linking a UI design environment to an application development environment. A user interface (UI) requirement is received, applying to creation of a UI object that is to be included in an application to be created. An input from a UI designer is received to create the UI object, the input being made in a UI design environment in which the UI requirement is available to the UI designer. The UI object and the UI requirement are provided to an application development environment for an application developer to create the application that includes the UI object. The UI requirement may be received through a top-down approach or through a bottom-up approach. A system may have a linking element between the UI design environment and the application development environment.

19 Claims, 11 Drawing Sheets

(56) References Cited

OTHER PUBLICATIONS

Schaff, Stan, "The Mobile Mind," Forrester Big Idea, Jul. 23, 2004, pp. 1-17.

Orlov, Laurie and Ramos, Laura, "Organic Information Abstraction," Forrester Big Idea, May 12, 2004, pp. 1-15.

Ramos, Laura and Rasmus, Daniel W., "Best Practices in Taxonomy Development and Management," Planning Assumption, Giga Information Group, Inc., Jan. 8, 2003, pp. 1-11.

Harris et al., "Taxonomy Creation: Bringing Order to Complexity," Gartner, Inc., Sep. 10, 2003, pp. 1-6.

Brand, John et al., "When Too Much Content is Barely Enough," Meta Delta, Jan. 29, 2003, pp. 1-4.

Zetie, Carl and Barnett, Liz, "Why Enterprise Application Development is So Hard—and How it Must Get Easier," Forrester, Trends, Aug. 20, 2004, pp. 1-11.

'Business Process Management with SAP NetWeaver' [online]. SAP AG, publication date unavailable, [retrieved on Dec. 27, 2005]. Retrieved from the Internet: <URL: http://www.sap.com/solutions/netweaver/pdf/BWP_NetWeaver_BPM.pdf>.

'User Productivity Enablement with SAP NetWeaver' [online]. SAP AG, publication date unavailable, [retrieved on Dec. 27, 2005]. Retrieved from the Internet: <URL: http://www.sap.com/solutions/netweaver/pdf/BWP_SB_User_Productivity_Enablement.pdf>.

'Business Drives Technology: SAP Fuels the Next Bold Move in Software' [online]. SAP AG, publication date unavailable, [retrieved on Dec. 27, 2005]. Retrieved from the Internet: <URL: http://www.sap.com/solutions/netweaver/pdf/BWP_NetWeaver_Overview.pdf>.

'Enterprise Compensation Management with mySAP ERP' [online]. SAP AG, publication date unavailable, [retrieved on Dec. 27, 2005]. Retrieved from the Internet: <URL: http://www.sap.com/solutions/business-suite/erp/pdf/BWP_SID_Enterprise_Compensation.pdf>.

'Development environment' [online]. IBM, publication date unavailable, [retrieved on Dec. 27, 2005]. Retrieved from the Internet: <URL: http://www.research.ibm.com/elite/IDE/ide.html>.

'Platform Architecture' [online]. $EMC^2$, publication date unavailable, [retrieved on Dec. 27, 2005]. Retrieved from the Internet: <URL: http://www.documentum.com/products/platform/index.htm>.

'Web Content Management' [online]. Interwoven, publication date unavailable, [retrieved on Dec. 27, 2005]. Retrieved from the Internet: <URL: http://www.interwoven.com/solutions/wcm/index.html>.

'Taxonomy Warehouse' [online]. Synapse, the Knowledge Link Corporation, publication date unavailable, [retrieved on Dec. 27, 2005]. Retrieved from the Internet: <URL: http://www.taxonomywarehouse.com/querybycat.asp>.

'Inxight Star Tree Demos' [online]. Inxight, publication date unavailable, [retrieved on Dec. 27, 2005]. Retrieved from the Internet: <URL: http://www.ischool.washington.edu/tabrooks/424/OrganizationMetaphors/StarTrees/Inxight . . .>.

* cited by examiner

LINKING USER INTERFACE DESIGN ENVIRONMENT AND APPLICATION DEVELOPMENT ENVIRONMENT

TECHNICAL FIELD

The description relates to making a user interface (UI) requirement available in a UI design environment and in an application development environment.

BACKGROUND

Today there are guidelines or other rules or that apply to almost all graphical user interfaces (GUI) to be designed for systems, platforms or computing environments. The guidelines may stem from a desire to make the GUI user-friendly, from a technical restriction in the implemented system, or from legislation that requires the GUI to be accessible to the visually impaired, to name a few examples. Such guidelines are sometimes very extensive which means that it may be difficult for the individual designer to learn them in their entirety so that they can be applied in the design process. Also, the guidelines may change from time to time so there is a need for timely updates. UI guidelines have been provided to the designer in hard copy or in a form that is otherwise not integrated with the design/development environment, for example by storing them in a file of the computer system.

An exemplary design/development procedure may include the following separate phases: 1) A solution manager, an infrastructure architect and a UI designer capture user requirements for the UI, determine one or more user scenarios and thereafter create a UI design. 2) The solution manager, the infrastructure architect and the UI designer decide on an UI architecture and thereafter design, test and validate the UI design and deliver a UI prototype together with a specification. 3) The infrastructure architect, an application developer and the UI designer build the technical design, implement the technical and UI design while attempting to follow the UI guidelines and rules. 4) A quality manager, the application developer and the UI designer verify functional behavior of the application, review the UI according to the UI requirements and retest/modify the application until finished.

It happens that developers and designers violate UI rules and standards. Sometimes this is inadvertent, such as when the designer or developer is not aware of the specific rule that applies. For example, a UI designer may create a UI prototype taking into account any or all UI guidelines and thereafter forward the prototype to a developer to create the actual application. The developer, in turn does not know what UI requirement(s) shaped the UI designer's work and may violate it/them in creating the application. Thus, UI requirements may be "lost" in the handover from designer to developer.

In other situations, the designer or developer ignores a certain guideline believing that it does not apply, or because compliance would require substantial effort. This scenario sometimes occurs in organizations where a large number of UI requirements are posted without sufficient efforts in integrating them with each other or making sure they are consistent. As a result, some applications are created with UIs that contain errors, inconsistencies or other defects. Accordingly, problems may result when UI prototypes have no impact on the development tools to be used, or when application developers have insufficient access to user requirements and guidelines.

SUMMARY

The invention relates to linking a UI design environment and an application development environment.

In a first general aspect, a method of supporting creation of an application having a user interface includes receiving a UI requirement that applies to creation of a UI object that is to be included in an application to be created. An input from a UI designer to create the UI object is received. The input is made in a UI design environment in which the UI requirement is available to the UI designer. The UI object and the UI requirement are provided to an application development environment for an application developer to create the application that includes the UI object.

Implementations may include any or all of the following features. The UI requirement may be received through a top-down approach from a usability layer to a service architecture layer. The top-down approach may involve a user interview, persona description or role specification relating to the usability layer, and the UI requirement may include metadata that can be applied to the UI object. The UI requirement may be received through a bottom-up approach from a service architecture layer to a usability layer. The bottom-up approach may involve an infrastructure developer creating the UI requirement corresponding to a technical restriction on the UI object, and the UI requirement may include metadata that can be applied to the UI object. The UI requirement may originate in a business logic layer underlying the service architecture layer. The method may further include applying the UI requirement to the UI object in the UI design environment. The method may further include adjusting the UI object, after applying the UI requirement, to comply with the UI requirement, and the adjusted UI object and the UI requirement may be provided to the application development environment. The UI designer may create, in the UI design environment, a UI prototype that includes the UI object, and the UI requirement may be applied to the UI prototype. The application development environment may contain a link to the UI design environment for the application developer to access the UI requirement.

In a second general aspect, a computer system includes a UI design environment in which a UI designer creates a UI object for inclusion in an application to be created. The computer system includes an application development environment for an application developer to create the application that includes the UI object. The computer system includes a linking element between the UI design environment and the application development environment. The linking element provides that the UI requirement is available to the UI designer in the UI design environment and to the application developer in the application development environment.

Implementations may include any or all of the following features. The computer system may further include a usability layer and a service architecture layer, and the UI requirement may be created through a top-down approach from the usability layer to the service architecture layer. The top-down approach may involve a user interview, persona description or role specification relating to the usability layer, and the UI requirement may include metadata that can be applied to the UI object. The computer system may further include a usability layer and a service architecture layer, and the UI requirement may be created through a bottom-up approach from the service architecture layer to the usability layer. The bottom-up approach may involve an infrastructure developer creating the UI requirement corresponding to a technical restriction on the UI object, and the UI requirement may include metadata that can be applied to the UI object. The computer system may apply the UI requirement to the UI object in the UI design environment. The computer system may adjust the UI object, after applying the UI requirement, to comply with the UI requirement, and the computer system may provide the adjusted UI object and the UI requirement to the application development environment. The UI designer may create, in the UI design environment, a UI prototype that includes the UI object, and the computer system may apply the UI requirement to the UI prototype. The application development environment may contain a link to the UI design environment for the application developer to access the UI requirement.

Advantages of the systems and techniques described herein may include any or all of the following: Providing a linking element between a UI design environment and an application development environment; providing an improved approach for designing a UI object to be used in an application; providing an increased flexibility in considering UI requirements when creating UI objects.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
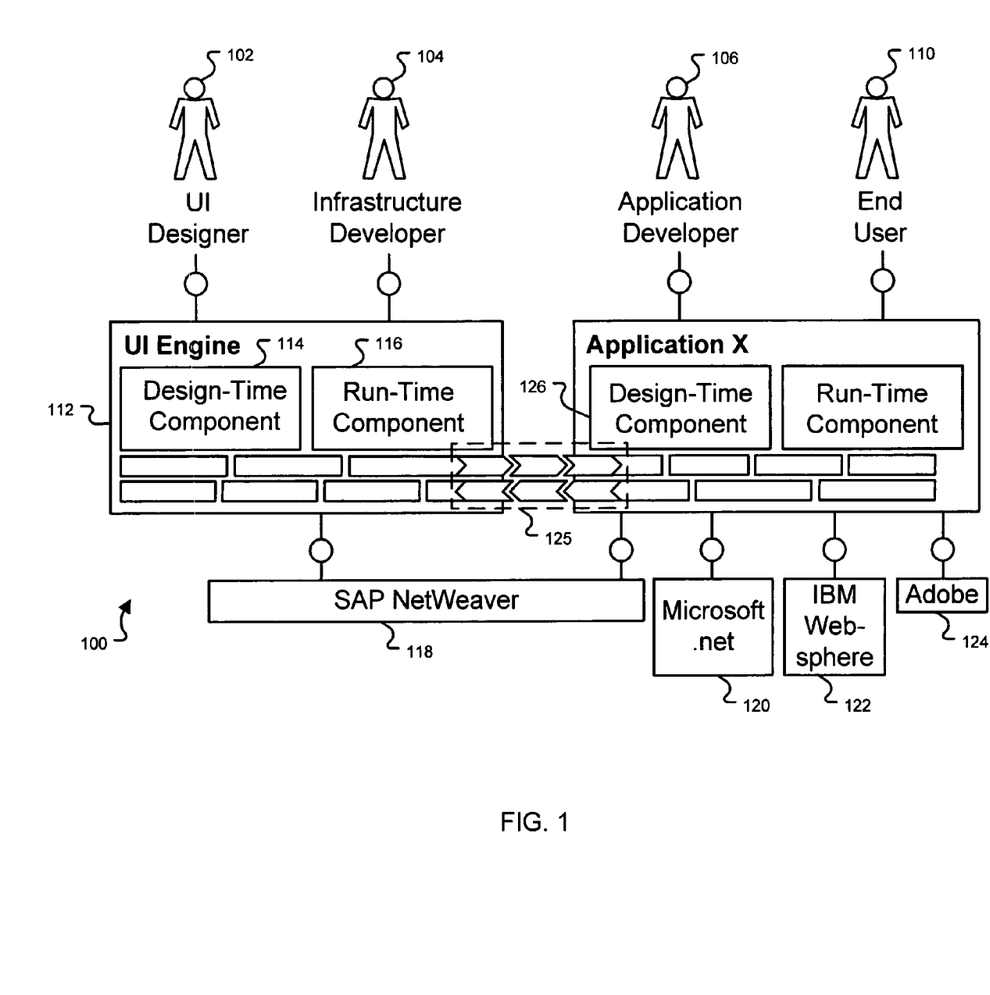
FIG. 1 schematically shows an enterprise system environment in which a UI requirement is available to a UI designer and to an application developer.

FIG. 1 schematically shows an enterprise system environment 100 in which an embodiment of the invention can be used. Particularly, the environment 100 supports creation of a UI object under a UI requirement, creation of an infrastructure for the UI object, creation of an application that includes the UI object, and deployment of the application for use. The people that are involved may include: at least one UI designer 102 who creates the UI object; at least one Infrastructure Developer 104 that creates the infrastructure; at least one application developer 106 that creates an application 108 that includes the UI object; and at least one end user 110 that uses the application 108. The environment 100 may reside on a single device or may be distributed over several devices.

Particularly, the environment 100 includes a UI engine 112 that the UI designer 102 and the infrastructure developer 104 can use. The UI engine handles UI requirements in a way that supports the individual designer, for example by making UI requirements available in an organized and comprehensible form or by automatically applying certain requirements to a UI object that the designer is working on.

The implementation of the UI engine constitutes a UI design environment in which designers or developers create and manage UI objects. Particularly, the UI engine includes a design-time component 114 that the UI designer can access to create, change and publish UI objects, develop UI prototypes, build relationships between UI objects, and model UI eventloops, to name a few examples. The UI engine 112 also includes a run-time component 116 that the infrastructure developer 104 can consult to learn about various UI requirements and the rationale for creating particular UI Objects. An infrastructure developer may also access the design-time component 112 when technical limitations or new infrastructure concepts are introduced. One example is when a new pattern—a predefined combination and arrangement of UI controls—is to be introduced.

The application 108 may be a so-called enterprise application that can be built and run under any of several platforms, such as a NetWeaver platform 118 available from SAP AG, or other platforms like Microsoft's .Net platform 120, IBM's WebSphere platform 122, or an Adobe platform 124. The application 108 is created in an application development environment such as any integrated development environment (IDE) product available from SAP (NetWeaver Studio), or Microsoft (Microsoft Visual Studio) or Adobe (Adobe Designer).

The application 108 includes a design-time component 126 with which the actual application implementation occurs: the UI is designed and configured by including the UI object created by the UI designer. These and other operations benefit from the existence of a linking element 125 between the UI design environment and the application development environment. The linking element 125 may comprise an integration of the respective environments so that information and logic can be shared and mutually be taken into account in the respective environments. For example, the linking element provides that the at least one UI requirement that is available to the UI designer in the UI design environment is made available to the application developer in the application development environment.

In short, services of the UI engine 112 are available to the application developer and the end user during development and use of the application 108. Particularly, application developers have access to UI objects integrated in the IDE. The end user, in turn, receives an application with a UI that is highly consistent and that has great usability. Moreover, the end user may access on-demand UI help, feedback and other features available directly through the UI engine 112.

Figure 2:
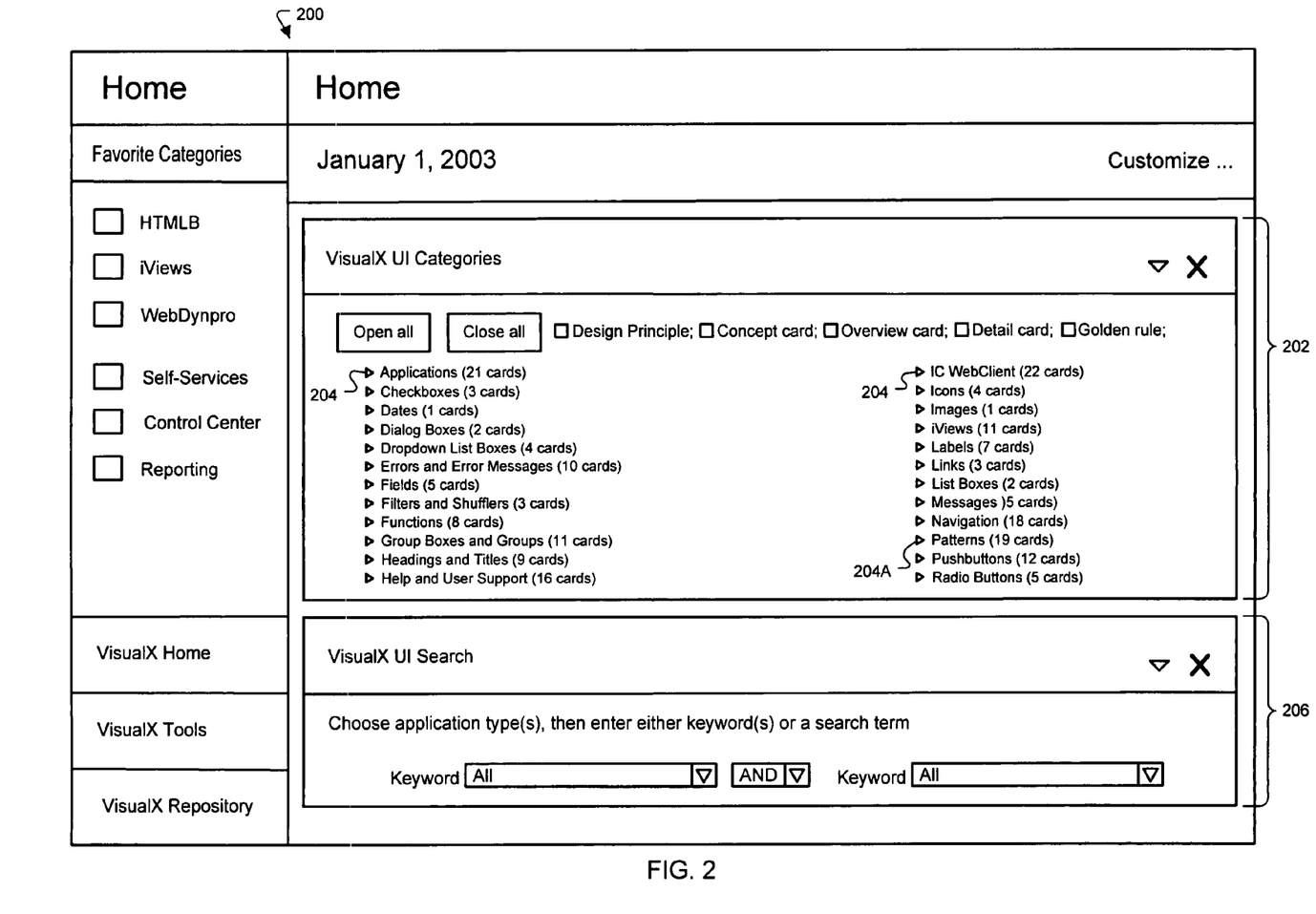
FIG. 2 is an example of a UI design tool in which the UI designer can create a UI object.

FIG. 2 shows an example of a GUI 200 that the UI engine 112 can generate. The GUI 200 may provide any or all of the following features: access to all features of the UI engine; search functionality for all UI objects; automatic checking of technical feasibility and/or company-wide guidelines for UI objects; detailed reporting capabilities for UI standards compliance; templates for usability surveys; efficient workflows including exception handling; and integration of test environments where the developing UIs are available. For example, a category area 202 provides access to multiple UI features that can be used in creating the UI object including headings, checkboxes and icons. Particularly, the area 202 includes a number of links 204 to these various features, which the UI designer can select to obtain the desired component(s) to be used in creating the UI object. A search area 206 lets the UI designer search for and find artifacts, which are a set of objects that UI designers work with. For example, using a specific link 204A the UI designer can select between a number of available patterns for generating the UI object. The UI object then defines the application-to-be-created as having the selected patterns. Accordingly, the GUI 200 is an example of a UI design environment in which the UI designer creates a UI object to be included in a future application.

Figure 3:
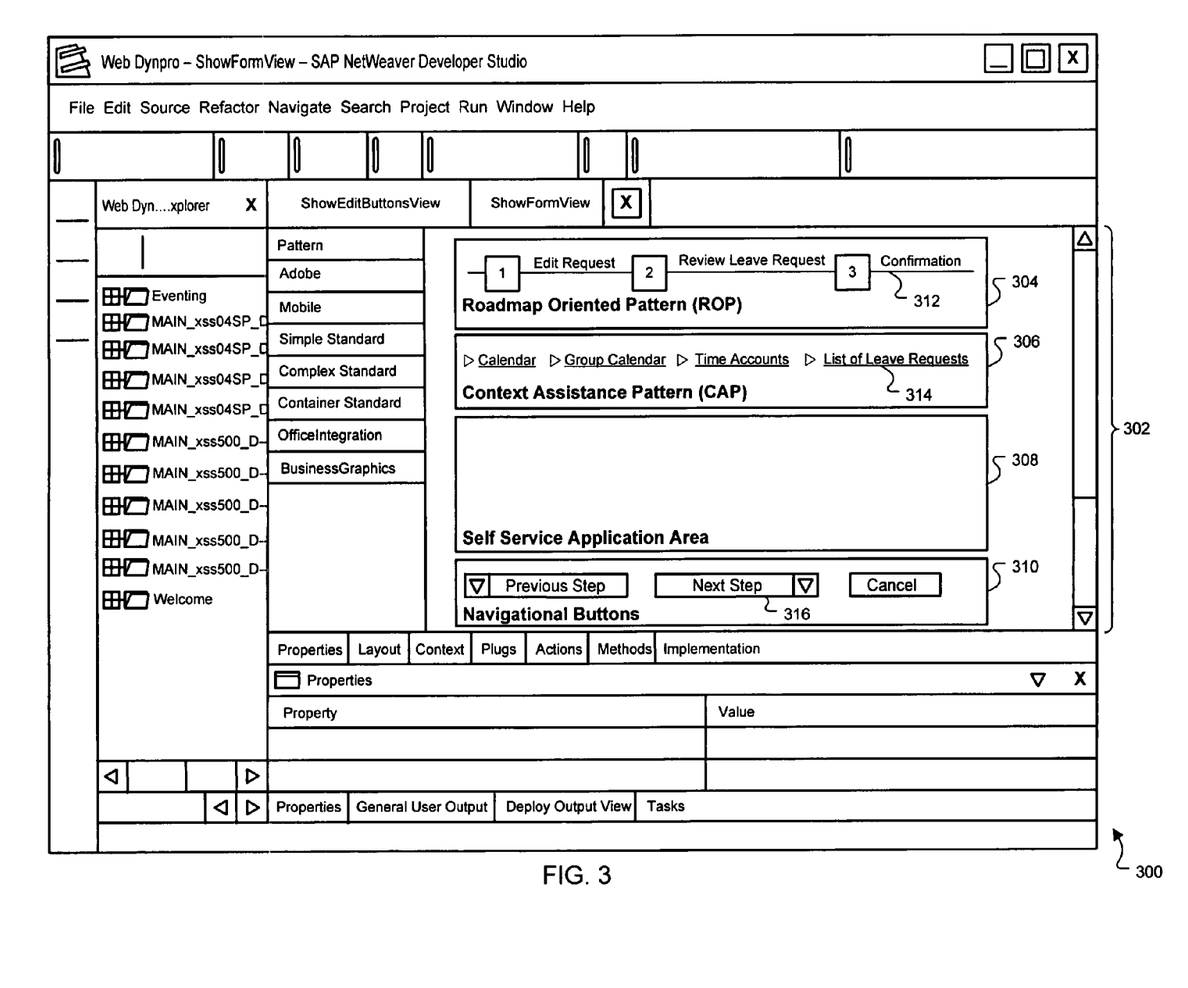
FIG. 3 shows an application development tool in which the application developer can create an application that includes the UI object.

FIG. 3 shows an example of a GUI 300 that can be generated in the application development environment, that is, by an IDE. Here, the GUI 300 is generated by the SAP NetWeaver Studio. The GUI 300 provides the application developer real-time support for application development. An exemplary use of the GUI 300 is that the application developer starts a new project and selects an applicable UI role to which the application relates. The application development environment then proposes UI templates and makes available relevant aspects of the UI engine 112, such as the UI requirement that was applied in creating the UI object.

The UI object is provided from the UI design environment to the application development environment through the linking element 125. A development area 302 in the GUI 300 lets the application developer see the UI object that the UI designer created and use that object in creating the application. Here, the UI object includes four patterns 304-310. The patterns are predefined as part of the infrastructure that is available for creating new applications. Particularly, the pattern 304 is labeled "Roadmap Oriented Pattern" and relates to providing the end user a guided sequence similar to that of a wizard. The pattern 306 is labeled "Context Assistance Pattern" and relates to providing the end user access to context information that may aid the completion of the guided sequence. The pattern 308 is labeled "Self-Service Application Area" and relates to services that allow the end user to perform complex operations in the underlying business software. The pattern 310 is labeled "Navigational Buttons".

The application developer can now create the application that is to include the UI object received from the UI design environment. For example, the developer can include in the pattern 304 an interactive structure 312 that includes individually selectable icons representing one or more steps in the guided sequence. As another example, the developer includes in the pattern 306 one or more links 314 to context information such as a calendar or a list of leave requests. As another example, the developer includes in the pattern 310 one or more icons 316 representing navigation within the guided sequence defined in the pattern 304.

Figure 4:
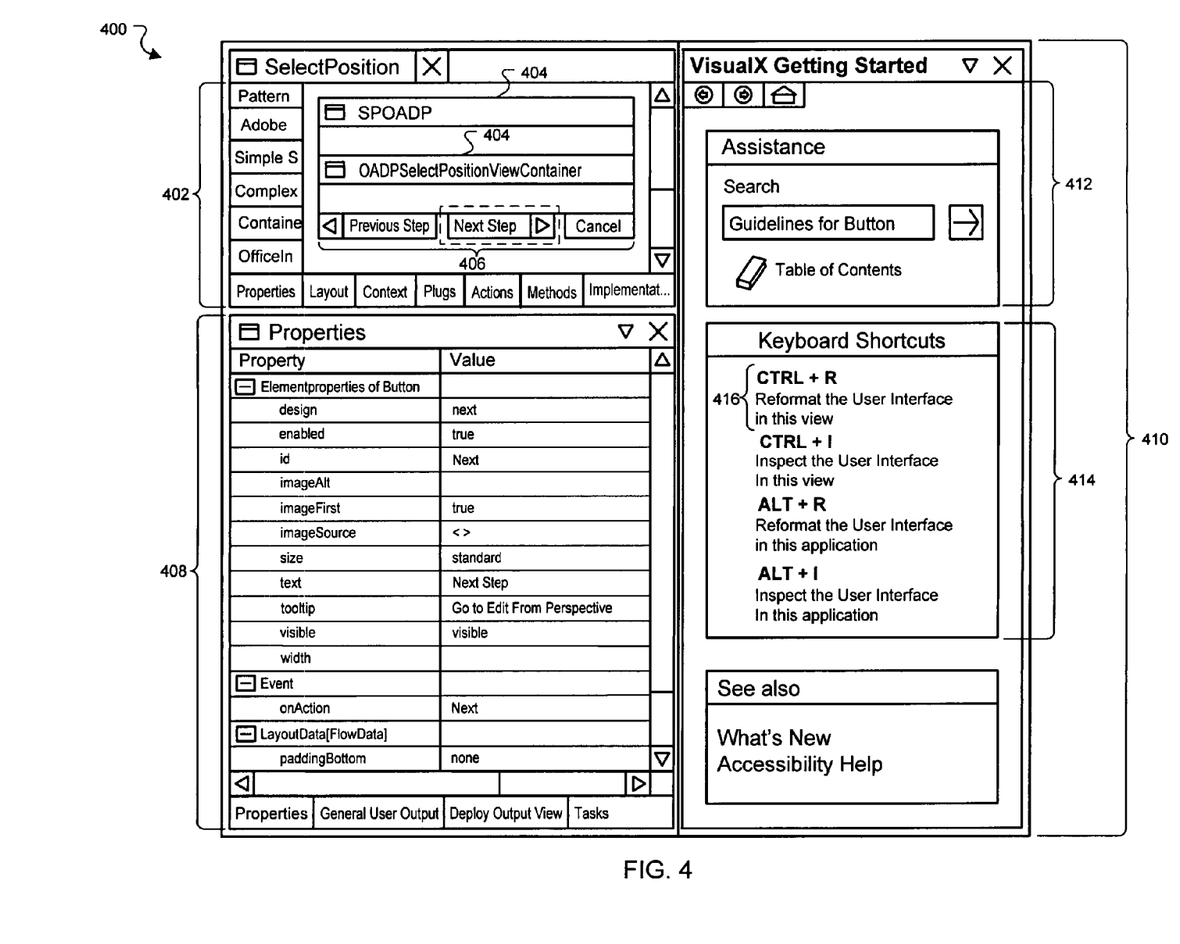
FIG. 4 shows a tool for developing an infrastructure for the application.

FIG. 4 shows an example of a GUI 400 that can be generated for the infrastructure developer 104 to develop infrastructure with which UI objects created using the UI engine are to be used. The GUI 400 is considered an infrastructure development environment and may be generated by an IDE program. The GUI 400 provides access to information from the UI engine, as well as search/review/compare features that can be applied to one or more of the UI objects. For example, the GUI 400 may provide that check compliance of newly added UI objects against UI requirements.

Here, the infrastructure developer has defined, in an area 402, that the infrastructure includes a pair of patterns 404 being displayed simultaneously and that there is a navigation function 406 for the end user to move through a sequence of other patterns or other UI features. In an area 408, the infrastructure developer can maintain properties of buttons to be displayed in, events to occur in, and layout data to be used in generating, the final UI of the application, to name some examples. The infrastructure developer 104 can see the UI object that the designer has created.

An area 410 of the GUI 400 provides the infrastructure developer access to some or all features of the UI engine 112. For example, an area 412 lets the developer search for guidelines that apply to the creation of the UI object(s). Such guidelines may be the source of the UI requirement that was applied in the creation of the UI object. Accordingly, the UI requirement can be provided to the infrastructure developer upon request. An area 414 lists at least one keyboard shortcut 416 that the infrastructure developer can use in the GUI. The shortcut 416 relates to applying the at least one UI requirement to the UI object that the UI designer creates.

Figure 5:
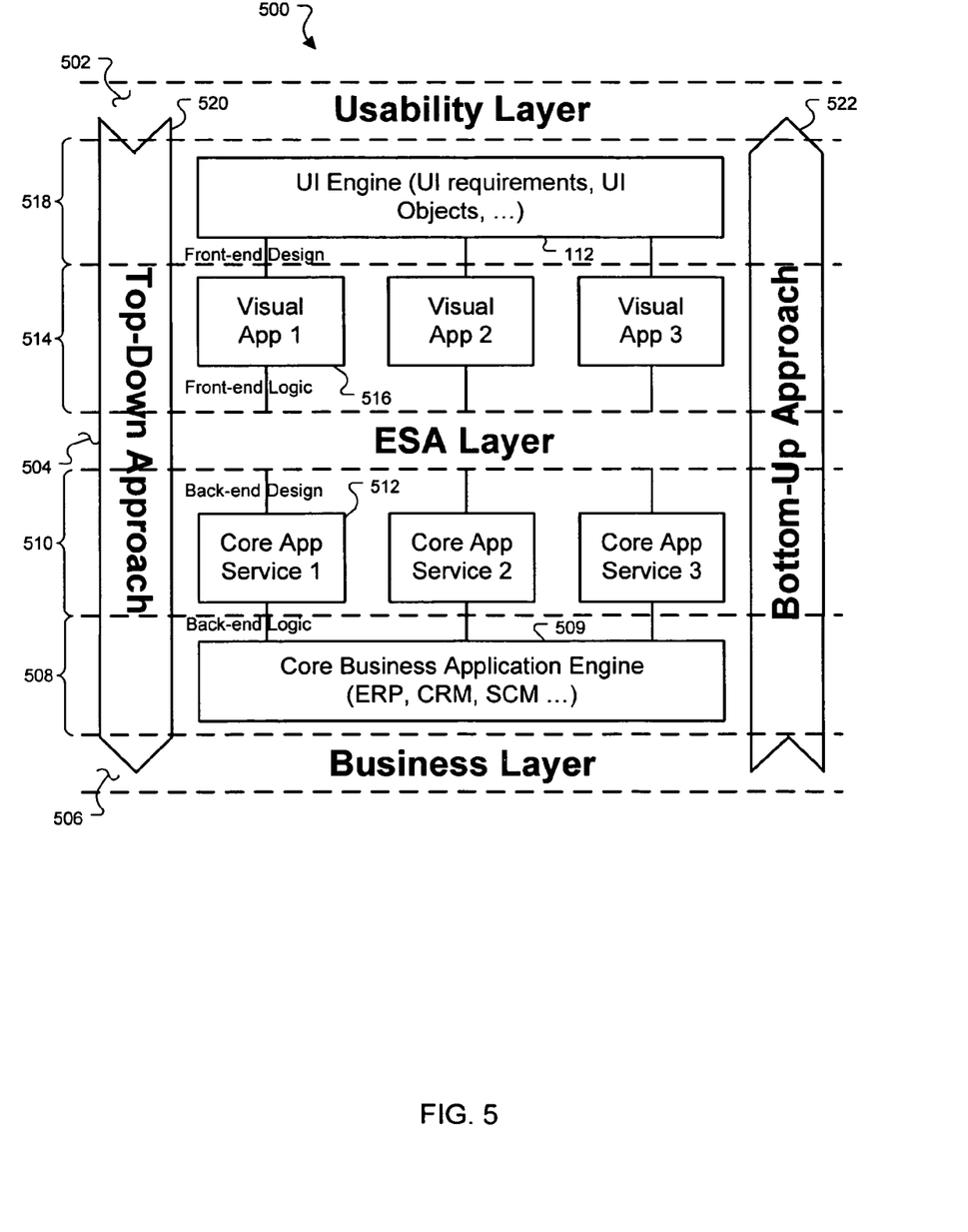
FIG. 5 schematically illustrates layers of the FIG. 1 enterprise system environment.

FIG. 5 shows an example of a layer architecture 500 for the enterprise system environment 100. Here, the layer architecture 500 includes a usability layer 502, an enterprise service architecture (ESA) layer 504 and a business layer 506. The usability layer 502 relates to anything that the user sees and actively works with in the environment 100. The business layer 506 relates to the underlying models and software that handles the business data and can perform a variety of operations. The ESA layer 504 relates to one or more services that are provided to users through the usability layer 502, the services using one or more of the operations in the business layer 506.

The business layer 506 includes back-end logic 508 that may be represented by common applications addressing business requirements, such as an enterprise resource planning (ERP) application or a customer relationship management (CRM) application. For example, the back-end logic 508 may include a core business application engine 509 providing the application(s). The business layer 506 also includes a back-end design 510 where at least one core application service 512 is modeled; for example, a service for creating a sales order. The ESA layer (or a so-called service oriented architecture layer) may in turn make the at least one core application service 512 available as a standard-based, platform-independent web service, meaning that it can be accessed from the usability layer using web technology.

The usability layer 502 includes front-end logic 514 that is represented by at least one visual application 516 that when appropriate consumes the web service(s) exposed by the ESA layer. The UI engine 112 is part of a front-end design 518 of the usability layer in which usability requirements are addressed. The UI engine 112 is configured to provide the visual application 516 with the necessary service(s) derived from the usability layer as well as any UI requirements imposed from the business or ESA layer. FIG. 5 may be considered an "outside view" of the exemplary UI engine 112.

The UI requirement meta-data can be flexibly captured by any of several approaches. For example, the UI requirement may be received through a top-down approach 520 from the usability layer 502 toward the ESA layer 504, or through a bottom-up approach 522 from the ESA layer 504 toward the usability layer 502.

Figure 6:
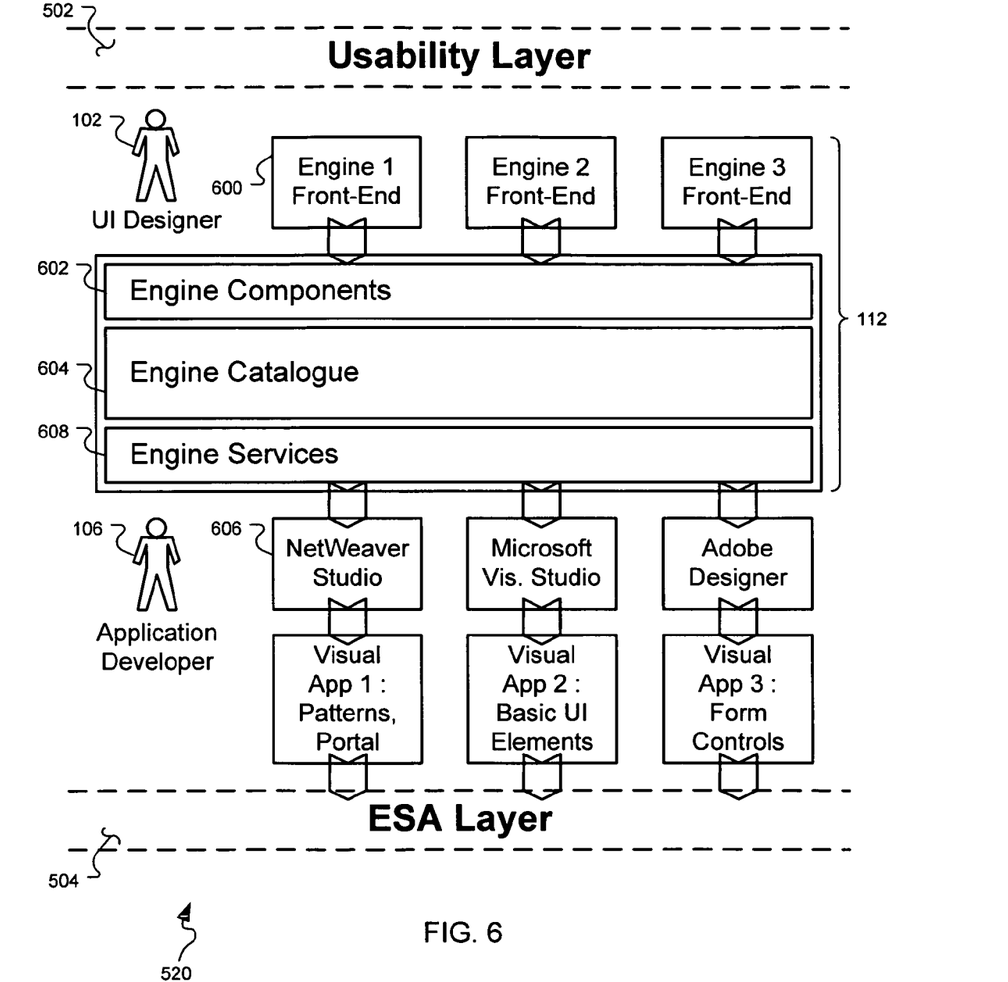
FIG. 6 illustrates that the UI requirement is received through a top-down approach in the FIG. 5 layers.

FIG. 6 illustrates the top-down approach 520 in which the UI requirement comes from the usability layer 502. For example, the UI requirement results from interviewing end-users, creating persona descriptions or delivering role specifications. The UI designer 102 may complete these tasks using one or more front-end tools 600 of the UI engine, the front-end tools being configured for their respective tasks they perform in the top-down approach. Components 602 of the UI engine comprise the design-time component 114 and the run-time component 116. The UI engine may include a catalogue 604 of meta data that describes UI features arranged in a hierarchy, for example in a taxonomy.

Here, the UI engine 112 interfaces with one or more IDE 606, such as NetWeaver Studio or Microsoft Visual Studio, and may include engine services 608 that provide for this interface, among other functions. Once any applicable UI requirement(s) is accounted for in the UI engine, the application developers can start with the development of the UI using their tool of choice. Accordingly, the UI requirement is provided to the application developer 106 working with the IDE 606, and the application being created can therefore conform to the UI requirement, by being automatically applied or by the application developer taking it into account.

Figure 7:
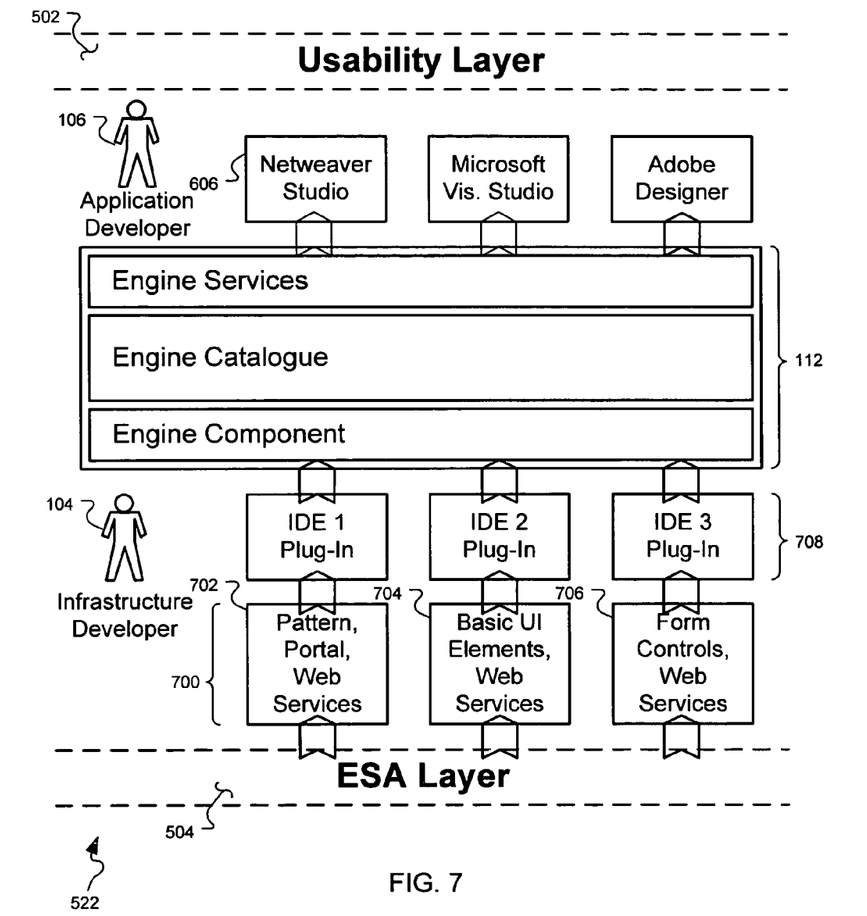
FIG. 7 illustrates that the UI requirement is received through a bottom-up approach in the FIG. 5 layers.

FIG. 7 illustrates the bottom-up approach 522 in which the UI requirement originates in a restriction that exists at a technical level. The UI engine allows the infrastructure developer 104 to define requirements of existing and new UI elements, patterns, at least one web service 700, etc. The technical requirements are made available to the application developer 106 (optionally together with any usability requirements captured by the UI designer), so that the requirement(s) can be applied in working with the IDE 606. In some implementations, there may be at least one web service 702 for patterns and portals, at least one web service 704 for basic UI elements, and at least one web service 706 for form controls. Any or all web services may be interfaced with the engine 112 through one or more plug-in features 708. For example, an integrated development environment (IDE) such as Eclipse can be designed to permit later adding-on of plug-ins, and the plug-in features 708 may be used for such an environment.

Figure 10:
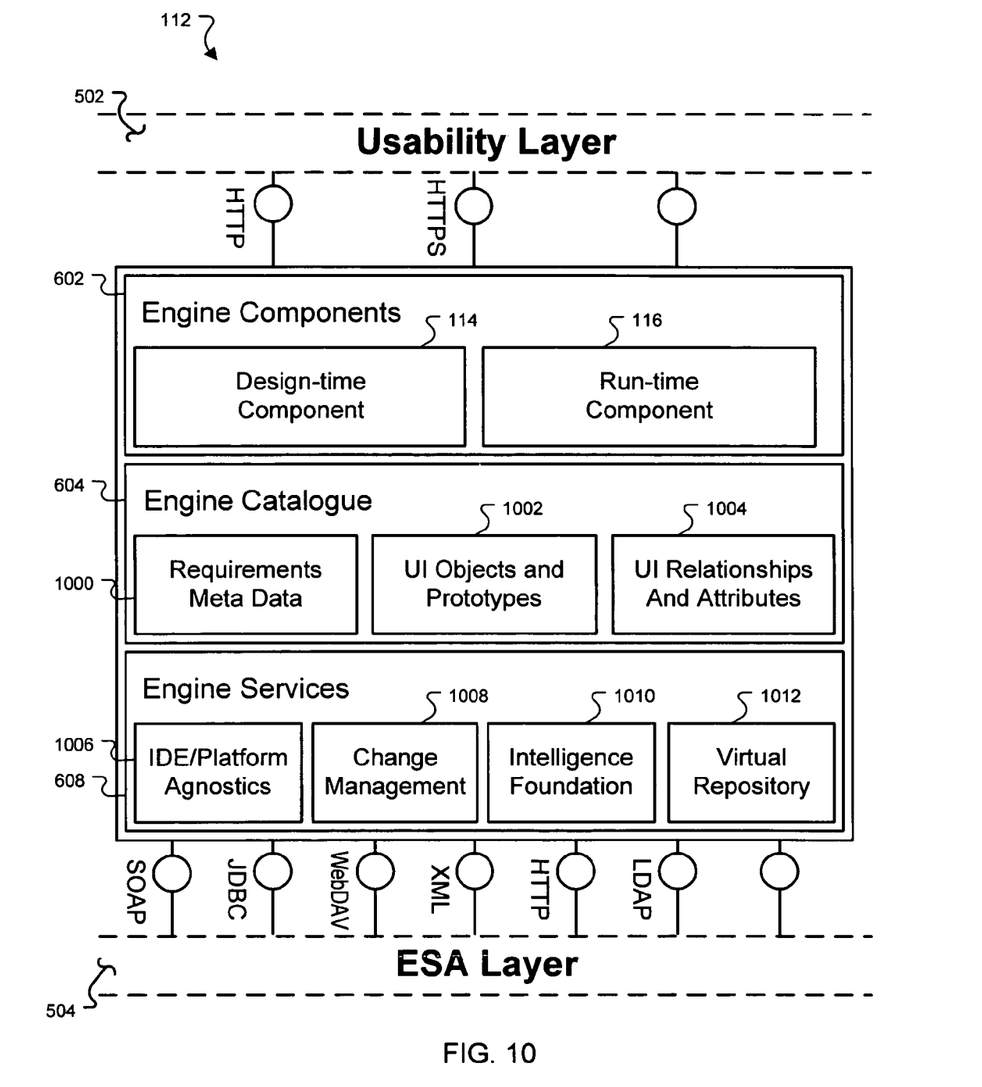
FIG. 10 shows an inside view of an exemplary UI engine.

FIG. 10 shows an exemplary architecture for the UI engine 112 made out of three parts. This may be thought of as an inside view of the engine, in contrast, for example, to FIG. 5 and its corresponding description, which is an outside view. The architecture of the UI engine 112 is shown between the usability layer 502 and the ESA layer 504. Here, the UI engine 112 includes the engine components 602, the engine catalogue 604 and the engine services 608.

The four roles of users (see FIG. 1) in the system can interact with any or all of the engine components 602 in a design environment. That is, they can interact with the design-time component 114 or with the run-time component 116. The design-time component 114 can be used in generating UI objects and for developing UI prototypes, for example. The run-time component 116 can provide information about UI requirements or UI Objects.

The engine catalogue 604 here contains a requirements meta data portion 1000 that includes all the meta-data derived from the UI requirements. The engine catalogue 604 includes a UI objects and prototypes portion 1002. For example, this portion is for the UI objects and UI prototypes generated with the design-time component 114. The engine catalogue also includes a UI relationships and attributes portion 1004 that includes relationships and attributes used by either or both of the design-time component 114 and the run-time component 116.

The engine services 608 are generic services used inside or outside the engine. For example, the engine services may be used in communicating UI rules and concepts to a development tool such as Adobe Designer. This allows the UI engine 112 to work with products of other software vendors to support the development of UIs on third-party platforms. The engine services 608 includes an IDE/platform agnostics portion 1006 that allows the engine 112 to interact with different IDEs or with different platforms. For example, the portion 1006 may provide that the engine 112 interacts with different GUI builders, editors and compilers, to name just a few examples. A change management portion 1008 may manage changes in the UI engine 112. For example, the changes may relate to the UI objects or the UI prototypes.

The engine services 608 includes an intelligence foundation 1010 that may be a technical component built to provide adaptive UI personalization, manage end-user performance metrics, and maintain UI history. In some implementations, the intelligence foundation 1010 provides or interacts with a UI agent software providing a context-aware, affinity-enabled UI that anticipates user needs and assists with goals. The engine services 608 further includes a virtual repository 1012 that allows access to third party UI metadata. This may provide that third-party UI content can be assembled, virtually visualized and adapted, to name a few examples.

Figure 8:
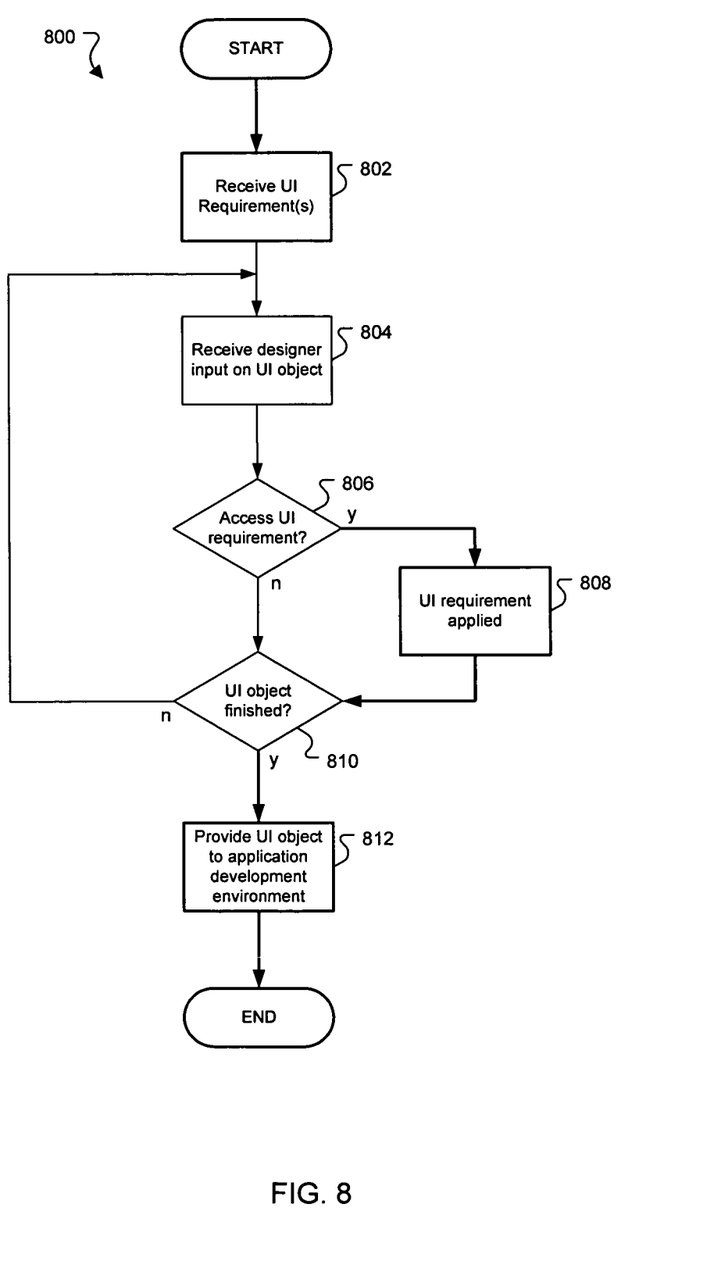
FIG. 8 is a flow chart of an exemplary method.

FIG. 8 shows a flow chart of an exemplary method 800 of supporting creation of an application having a UI. The method 800 can be performed using a computer program product, that is, by a processor executing instructions stored in a computer readable medium. The method 800 comprises:

Receiving, in step 802, at least one UI requirement that applies to creation of a UI object that is to be included in an application to be created. For example, the UI requirement may relate to a usability feature or to a technical restriction. A UI requirement relating to a usability feature may be received through the top-down approach 520; a UI requirement relating to a technical restriction may be received through the bottom-up approach 522.

Receiving, in step 804, an input from a UI designer to create the UI object, the input being made in a UI design environment in which the UI requirement is available to the UI designer. Steps 806 and 808 determine whether to access and thereafter apply the UI requirement. For example, the UI designer 102 can make the input using the GUI 200 of the UI engine 112, the GUI being part of the UI design environment and making available the UI requirement. For example, the UI object defines the application as having one or more selected patterns. According to step 810, steps 804-808 are repeated until the UI object is finished.

In step 812, when the UI object is finished, the system provides the UI object and the UI requirement to an application development environment for an application developer to create the application that includes the UI object. For example, transfer from the UI engine 112 to the application 108 may take place using the linking element 125. The application developer 106 may create the application using the GUI 300 provided by the IDE 606.

Figure 11:
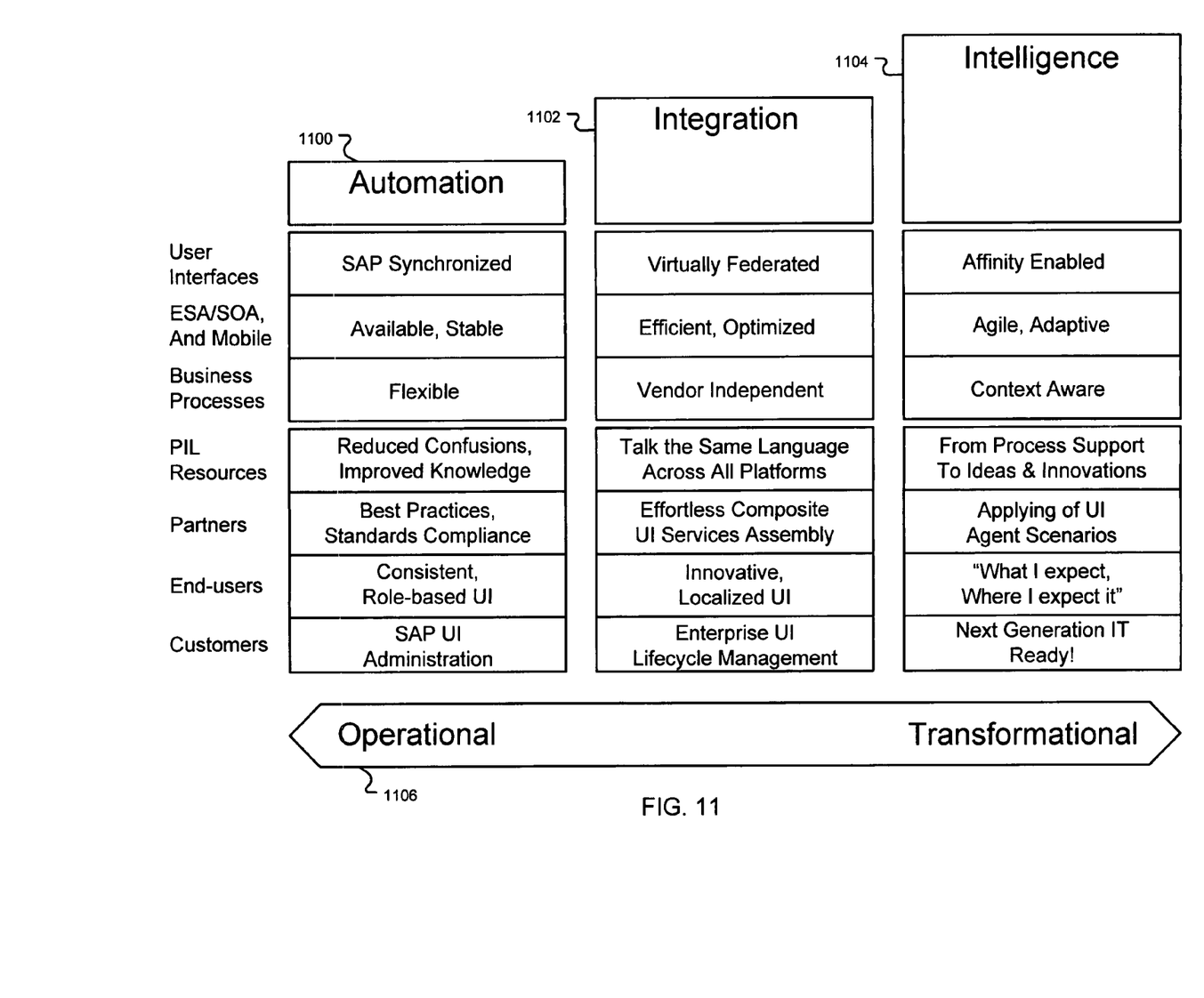
FIG. 11 schematically shows an exemplary process of a software landscape evolution using a UI engine.

FIG. 11 schematically shows an example of how a software environment, such as that provided by products from SAP AG, can be made to evolve over time, and how all interconnected areas of impact progress follow the growth thereof. This can be accomplished using the UI engine 112, the linking element 125 and other features described herein. These entities may be implemented as an overarching area for all concepts, components and features related to automation and management of Enterprise UIs. The process is outlined using three stages: a process automation stage 100, a UI integration stage 1102 and a usability intelligence stage 1004. A sliding parameter 1106 spanning the three stages shows how their focus varies between different degrees of being operational (towards the process automation stage 1100) and being transformational (towards the usability intelligence stage 1104).

In each stage, the implementation of techniques described herein impacts the UI with different objectives and benefits for the relevant target groups. For example, the process automation stage 100 may provide synchronization of all UIs and provide flexible business processes using a service architecture (such as ESA) or a mobile platform. With the process automation stage 100 in place, product innovation lifecycle (PIL) resources such as solution managers, developers, UI designers and architects become more knowledgeable and efficient during the UI development process. Partners may build SAP-compatible applications based on UI best practices and standards like Section 508. End-users are able to interact with software built for their roles with a very high level of consistency. It is made easier for customers to administer the applications like custom-fit UI requirements.

The UI integration stage 1102 creates an environment for virtualizing and federating UIs from several or all software vendors, based on the service architecture or the mobile platform. Business processes can be moved across vendor boundaries. PIL resources can follow the HIM process and use the system deliverables across all UI platforms (e.g. Adobe, Microsoft, and IBM). Partners can assemble real composite applications made out of UI services from different providers. End-users are provided with dynamic and localized UI based on how they want to view it, and it is provided that customers can manage the full UI lifecycle.

The usability intelligence stage 1104 will make UIs able to adapt to affinities, advanced personalization and policies set-up by the end users. The business processes can be made aware of the context when the UI is accessed, and can adapt accordingly. PIL resources can be relieved of process support duties and have more time for other tasks. Partners can create UI agent scenarios based on the HIM Intelligence stack. End-users are provided with intelligent UIs that are available when and where needed, and customers are ready for the next generation IT.

Figure 9:
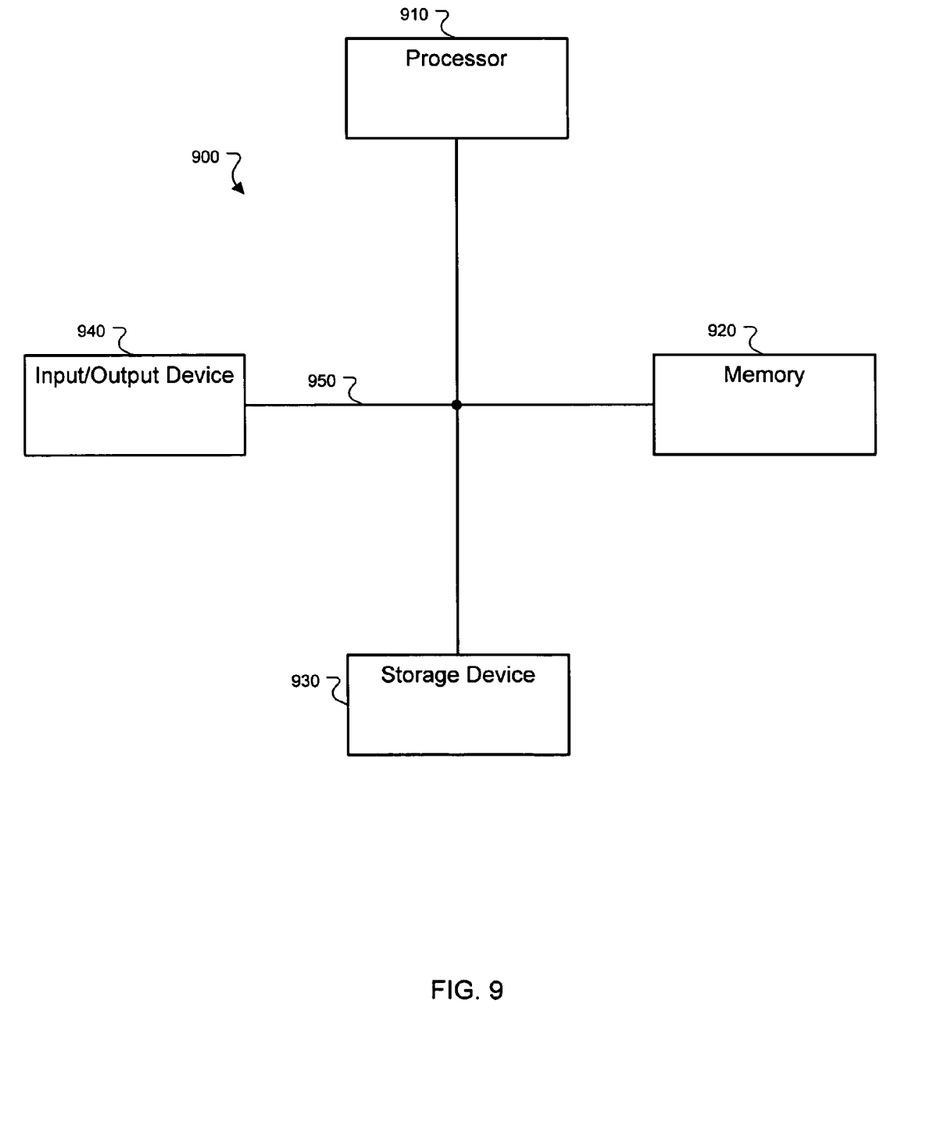
FIG. 9 is a block diagram of a general computer system.

FIG. 9 is a block diagram of a computer system 900 that can be used in the operations described above, for example in the environment 100. The system 900 includes a processor 910, a memory 920, a storage device 930 and an input/output device 940. Each of the components 910, 920, 930 and 940 are interconnected using a system bus 950. The processor 910 is capable of processing instructions for execution within the system 900. In one embodiment, the processor 910 is a single-threaded processor. In another embodiment, the processor 910 is a multi-threaded processor. The processor 910 is capable of processing instructions stored in the memory 920 or on the storage device 930 to display graphical information for a user interface on the input/output device 940.

The memory 920 stores information within the system 900. In one embodiment, the memory 920 is a computer-readable medium. In one embodiment, the memory 920 is a volatile memory unit. In another embodiment, the memory 920 is a non-volatile memory unit.

The storage device 930 is capable of providing mass storage for the system 900. In one embodiment, the storage device 930 is a computer-readable medium. In various different embodiments, the storage device 930 may be a floppy disk device, a hard disk device, an optical disk device, or a tape device.

The input/output device 940 provides input/output operations for the system 900. In one embodiment, the input/output device 940 includes a keyboard and/or pointing device. In one embodiment, the input/output device 940 includes a display unit for displaying graphical user interfaces. For example, the input/output device can generate any or all GUIs described herein.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of supporting creation of an application having a user interface, the method comprising:
   receiving a user interface (UI) requirement that applies to creation of a UI object, wherein the UI object is to be included in an application to be created, and the UI requirement is derived from at least one of a usability layer, an enterprise service architecture layer, or a business layer of the application;

storing the UI requirement within a UI Engine;

generating a UI design environment within the UI Engine, wherein the UI requirement is accessible from within the UI design environment;

receiving an input to create the UI object, the input being made in the UI design environment;

validating conformance of the UI object to the UI requirement; and providing the UI object and the UI requirement to an application development environment to create the application that includes the UI object and conforms to the UI requirement.

2. The method of claim 1, wherein the UI requirement is received through a top-down approach from a usability layer to a service architecture layer.

3. The method of claim 2, wherein the top-down approach involves a user interview, persona description or role specification relating to the usability layer, and wherein the UI requirement comprises metadata that can be applied to the UI object.

4. The method of claim 1, wherein the UI requirement is received through a bottom-up approach from a service architecture layer to a usability layer.

5. The method of claim 4, wherein the bottom-up approach involves an infrastructure developer creating the UI requirement corresponding to a technical restriction on the UI object, the UI requirement comprising metadata that can be applied to the UI object.

6. The method of claim 4, wherein the UI requirement originates in a business logic layer underlying the service architecture layer.

7. The method of claim 1, further comprising applying the UI requirement to the UI object in the UI design environment.

8. The method of claim 7, further comprising adjusting the UI object, after applying the UI requirement, to comply with the UI requirement, wherein the adjusted UI object and the UI requirement are provided to the application development environment.

9. The method of claim 7, wherein the UI designer creates, in the UI design environment, a UI prototype that includes the UI object, and wherein the UI requirement is applied to the UI prototype.

10. The method of claim 1, wherein the application development environment contains a link to the UI design environment for the application developer to access the UI requirement.

11. A computer system comprising:
one or more processors;
a memory coupled to the one or more processors the memory configured to store a UI requirement, wherein the UI requirement controls at least one aspect of a UI object to be created, and the UI requirement is derived from at least one of a usability layer, an enterprise service architecture layer, or a business layer of the application;
a user interface (UI) engine coupled to the one or more processors, the UI engine to provide a UI design environment configured to create the UI object conforming to the UI requirement stored in the memory, wherein the UI object is created for inclusion in an application to be created;
an integrated development environment (IDE) application coupled to the UI engine to provide an application development environment to enable creation of the application that includes the UI object; and
a linking element coupled to the UI engine and the IDE application enabling access to the UI requirement the UI design environment and by the application development environment.

12. The computer system of claim 11, wherein the UI requirement is created based on information associated with at least one user.

13. The computer system of claim 12, wherein the information associated with the user involves a user interview, persona description or role specification, and wherein the UI requirement comprises metadata that can be applied to the UI object.

14. The computer system of claim 11, wherein the UI requirement is created based on information associated with the system.

15. The computer system of claim 14, wherein the information associated with the system relates to a technical restriction on the UI object, the UI requirement comprising metadata to be applied to the UI object.

16. The computer system of claim 11, wherein the UI object is adjusted, after applying the UI requirement, to comply with the UI requirement, and wherein the adjusted UI object and the UI requirement are provided to the application development environment.

17. The computer system of claim 11, wherein a UI prototype is created, in the UI design environment, that includes the UI object, and wherein the UI requirement is applied to the UI prototype.

18. The computer system of claim 11, wherein the application development environment contains a link to the UI design environment to enable accessing the UI requirement.

19. A computer program product tangibly embodied in a non-transitory computer-readable medium, the computer program product including instructions that, when executed, cause a processor to perform operations comprising:
receiving a user interface (UI) requirement that applies to creation of a UI object, wherein the UI object is to be included in an application to be created, and the UI requirement is derived from at least one of a usability layer, an enterprise service architecture layer, or a business layer of the application;
storing the UI requirement within a UI Engine;
generating a UI design environment within the UI Engine, wherein the UI requirement is accessible from within the UI design environment;
receiving an input from to create the UI object, the input being made in the UI design environment;
validating conformance of the UI object to the UI requirement; and
providing the UI object and the UI requirement to an application development environment to create the application that includes the UI object.

* * * * *